Sept. 19, 1944.  W. C. KNAPP  2,358,516
UNDERCUTTING ATTACHMENT FOR DRILL PRESSES
Filed Feb. 15, 1943  2 Sheets-Sheet 1
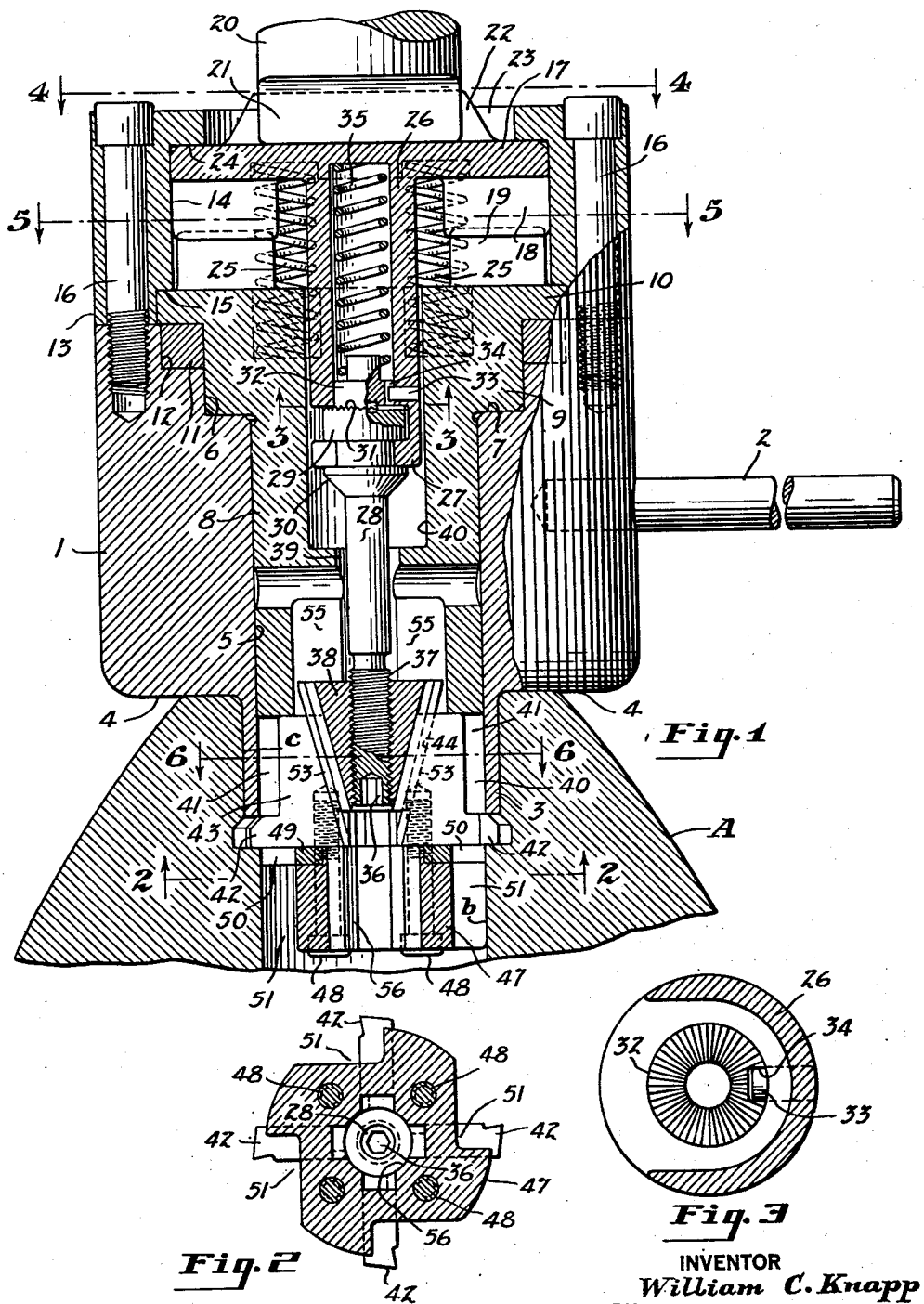
INVENTOR
William C. Knapp
BY
Evans + McCoy
ATTORNEYS Sept. 19, 1944. W. C. KNAPP 2,358,516
UNDERCUTTING ATTACHMENT FOR DRILL PRESSES
Filed Feb. 15, 1943 2 Sheets-Sheet 2
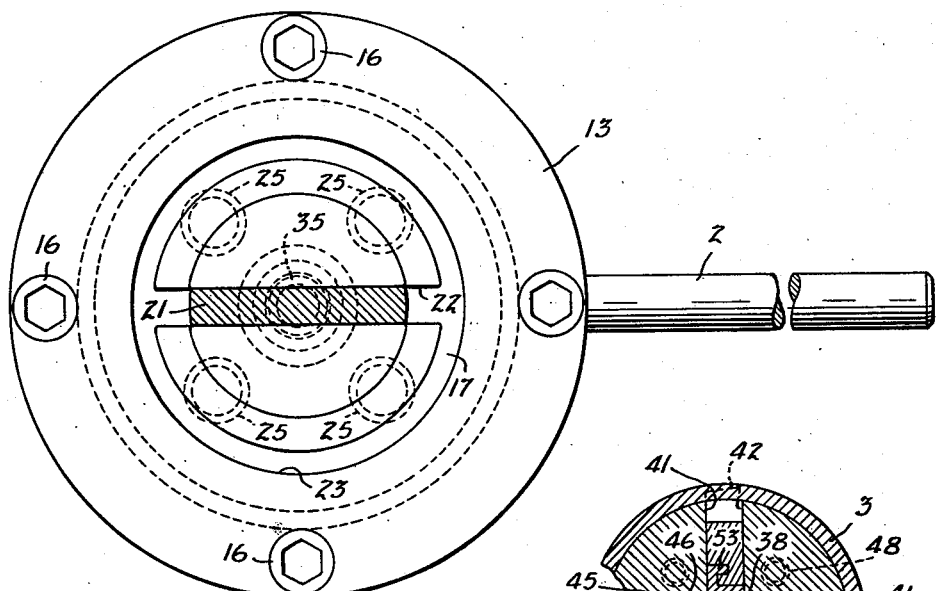
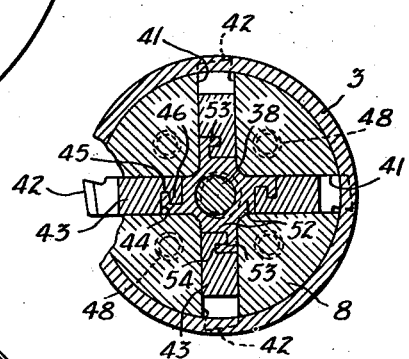
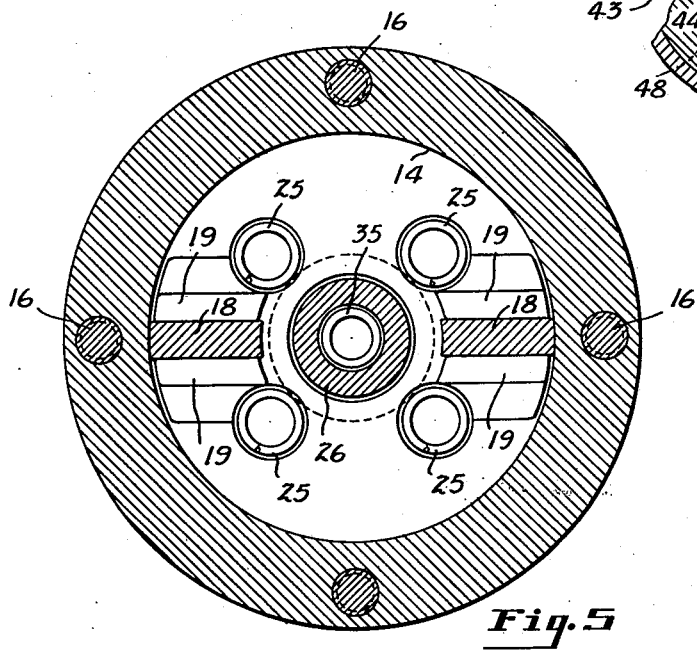
INVENTOR
William C. Knapp
BY
Evans + McCoy
ATTORNEYS Patented Sept. 19, 1944

2,358,516

UNITED STATES PATENT OFFICE 2,358,516

UNDERCUTTING ATTACHMENT FOR DRILL PRESSES

William C. Knapp, Wabash, Ind., assignor to The General Tire & Rubber Company, Akron, Ohio, a corporation of Ohio Application February 15, 1943, Serial No. 475,871

16 Claims. (Cl. 77—58)

This invention relates to an undercutting attachment for a drill press designed for undercutting the wall of a hole in a body of metal or other material and is particularly useful for undercutting in a hole to provide thread chaser clearance.

The device of the present invention has for its object to provide a rotary undercutting tool adapted to be connected to a drill press spindle and having a cutter which is automatically expanded by axial pressure exerted through the spindle while it is being rotated by the spindle.

Further objects of the invention are to regulate the expansion of the cutter by adjusting the connection between the drive shaft and cutter, to provide means for automatically retracting the cutter upon release of the pressure on the spindle, and to provide means for properly positioning the cutter with respect to the work.

With the above and other objects in view, the invention may be said to comprise the device illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a central vertical section through an undercutting attachment embodying the invention;

Fig. 2 is a section taken on the line indicated at 2—2 in Fig. 1;

Fig. 3 is a section taken on the line indicated at 3—3 in Fig. 1;

Fig. 4 is a section taken on the line indicated at 4—4 in Fig. 1;

Fig. 5 is a section taken on the line indicated at 5—5 in Fig. 1; and

Fig. 6 is a section taken on the line indicated at 6—6 in Fig. 1.

The tool illustrated in the accompanying drawings is designed particularly for undercutting at the bottom of a counterbore in the nose of a bomb, Figure 1 of the drawings showing a portion of a bomb A having the bore b and a counterbore c in the nose portion thereof.

The attachment of the present invention has a housing 1 provided with a handle 2 to assist in positioning the device with respect to the work and to hold the housing against rotation during the cutting operation. The housing 1 has an axial projection 3 at its lower end, which is of a size to fit within the counterbore c, and has a shoulder 4 adapted to engage the end of the bomb A to position the housing with respect to the bomb. The housing 1 is provided with an axial bore 5 extending through the projection 3 and with a counterbore 6 which provides a shoulder 7 within the housing. A tubular shaft 8 is rotatably mounted in the bore 5 and has an enlarged upper end 9 which is seated on shoulder 7 and which is provided with a circumferential flange 10 which rests upon a bearing ring 11 seated in a recess formed by a second counterbore 12.

The housing 1 has a removable top section 13 which is provided with an axial bore 14, which is larger than the bore 5 in the lower portion of the housing but which is of somewhat less diameter than the flange 10, the section 13 being counterbored at its lower end to provide a ledge 15 that overhangs the margin of the flange 10 to hold the tubular shaft 8 against axial movement in the housing. The section 13 of the housing is secured to the body portion thereof by means of a series of axially extending bolts 16 extending through the full length of the tubular section 13.

A drive shaft head 17 is slidably and rotatably mounted within the bore 14 and has radially disposed depending lugs 18 which are slidably received between upwardly projecting lugs 19 on the top of the enlarged portion 9 of the tubular shaft 8. The head 17 is adapted to be connected to a spindle 20 which has a tongue 21 at its lower end which engages a diametrical groove 22 formed in the top of the head 17. The top section 13 of the housing is provided with an opening 23 to receive the spindle 20, the opening 23 being of a diameter less than the bore 14 to provide a ledge 24 at the top of the housing to limit the upward movement of the head 17.

A number of compression coil springs 25 are interposed between the upper end portion 9 of the tubular shaft 8 and the head 17; these springs serve to normally hold the head 17 in its uppermost position against the annular ledge 24 at the top of the housing. The head 17 has an axial tubular extension 26 which forms the body of the drive shaft, which extends into the tubular shaft 8 and which has a bearing collar 27 at its lower end which receives a shaft 28 which is coaxial with the tubular shaft 8, the shaft 28 having an enlarged head 29 above the collar 27 and an integral flange 30 bearing against the underside of the collar 27.

The shaft 28 is a cutter-shifting extension of the drive shaft which transmits axial thrusts only. Yieldable locking means is provided which normally holds the shaft 28 against rotation with respect to the drive shaft 28 but which permits the shaft 28 to be turned with respect to the shaft 26 upon application of torque to the shaft 28. The locking means is associated with the head 29 which has serrations 31 on its top surface which are engaged by similar serrations of a plunger 32, which is slidably mounted in the tubular shaft 26 and which is held against rotative movement by means of a pin 33 in the wall of the tubular extension 26 which engages in a vertical groove 34 in the plunger 32. A spring 35 within the tubular extension 26 is interposed between the plunger 32 and the head 17 to yieldingly press the plunger 32 against the head 29.

The shaft 28 has an aperture 36 shaped to receive a suitable tool for turning the shaft 28, the lower end of the shaft being provided with a screw thread 37 upon which a cutter-adjusting head 38 is mounted. The shaft 28 moves axially with the drive shaft and exerts an axial thrust upon the head 38, which may be adjusted axially by turning the shaft 28 within the head 38 and drive shaft 26.

The tubular shaft 8 is provided with a bore 39 to receive the shaft 28 and a counterbore 40 which receives the tubular shaft 26 and the enlarged upper portion of the shaft 28. The tubular shaft 8 has radial slots 41 at its lower end which provide keyways for the head 38 and which slidably receive cutters 42 that project radially beneath the projection 3 of the housing. The cutters 42 have vertical upwardly tapering shanks 43 which slidably fit in the slots 41. These shanks have flat, upwardly tapering inner edges 44 and each has a groove 45 in a side face parallel with its tapering edge 44. The inner wall of the groove 45 is formed by a short flange 46, the edge of which is inwardly offset from the side face of the cutter shank to which the groove opens. The lower end of the tubular shaft 8 is closed by a pilot 47 detachably secured to its lower end by means of bolts 48 and adapted to fit in the bore b. The pilot 47 provides a support for the cutters 42 so that the cutters have radial movement only in the slots 40. A wear-plate 49 may be interposed between the pilot 47 and cutters 41 and the pilot 47 and wear-plate 49 may be provided with registering peripheral recesses 50 and 51 beneath the edges of the cutters 42 for chip clearance.

The cutter adjusting head 38 tapers toward its lower end and has radial key ribs 52 which fit in the slots 41 and have flat faces adapted to bear against the flat inner edge faces 44 of the cutter shanks. The head also has radially projecting key flanges 53 which project from one side edge of each rib 52. The key flanges 53 have inturned edges 54 which are adapted to fit in the grooves 44 of the cutter shanks, the outer side faces of the key ribs 52 and the flanges 53 being flush with the side faces of the cutter shanks so that the interlocking key ribs and cutter shanks slidably fit in the slots 41. The upper ends of the key ribs 52 extend into clearance grooves 55 formed in the interior of the tubular shaft 8 above the slots 41. The engagement of the ribs 52 in the grooves 55 serves to positively hold the head 38 against turning movements with respect to the tubular shaft 8 so that when the shaft 28 is turned by means of a tool engaging in the socket 36, the head 38 is adjusted axially with respect to the tubular shaft 8. In order to permit adjustment of the cutter-actuating head without disassembling the tool, the pilot 46 is provided with a central hole 56 through which a suitable tool may be inserted for turning the shaft 28.

In the operation of the device, the housing is positioned with its projection 3 in the hole which is to be undercut and the spindle 20 is connected to the driving and pressure-applying member of a drill press so that the spindle 20 may be rotated while axial pressure is being exerted thereon. The cutters 42 are normally held by the springs 25 in a retracted position with their cutting edges within the outer periphery of the projection 3. When the head 38 is moved downwardly by axial pressure exerted on the head 17 and transmitted through the shaft 28 to the head 38, the cutters 42 are moved radially outwardly into engagement with the wall of the hole. Rotation of the spindle 20 imparts rotation through the keys 18 and 19 to the tubular shaft 8 which carries the cutters 42 so that the cutters are gradually fed radially outwardly against the wall of the hole while they are being rotated. When the head 17 is moved downwardly far enough to engage the ribs 18 with the upper end of the tubular shaft 8, the cutters 41 will have been moved radially outwardly to the full extent permitted.

The depth of the undercut may be regulated by adjusting the position of the head 38 on the shaft 28 by turning the shaft 28 by means of a tool as above described. When pressure on the spindle 20 is released, the springs 25 return the head 17 to its uppermost position and the shaft 28 and cutter-adjusting head 38 move with the head 17 and retract the cutters 42 to a position entirely within the projection 3 so that the tool can be lifted out of engagement with the work.

It is to be understood that variations and modifications of the specific device herein shown and described for purposes of illustration may be made without departing from the spirit of the invention.

What I claim is:

1. An undercutting attachment for a drill press comprising a housing, a cutter support rotatably mounted in the housing, means for holding said support against axial movement in the housing, a cutter movably mounted on said support, a drive shaft journaled in said housing, axially slidable in said housing and slidably keyed to said cutter support, and means operable upon axial movement of said shaft with respect to said cutter support for moving said cutter on said support.

2. An undercutting attachment for a drill press comprising a housing, a cutter support rotatably mounted in the housing and having a central bore provided with a longitudinal radial slot, a cutter mounted for radial movement on said support, a drive shaft axially slidable in said housing, a slidable key connection between said shaft and said cutter support, and an axially extending longitudinally tapering cutter adjusting head carried by said shaft and movable in said slot so as to shift said cutter on said support.

3. An undercutting attachment for a drill press comprising a housing, a tubular cutter support rotatably mounted in the housing and having a radial slot, means for holding said support against longitudinal movement in the housing, a drive shaft axially slidable in said housing and keyed to the cutter support, an axially extending cutter adjusting head carried by said shaft, said head being movable in said slot and having a longitudinally tapering outer edge, and a cutter mounted in said slot for movement toward or away from the axis thereof and having a portion engaging the tapering edge of said head.

4. An undercutting attachment for a drill press comprising a housing, a cutter support rotatably mounted in the housing and having an axial bore provided with a longitudinal radial slot, means for holding said support against longitudinal movement in the housing, a drive shaft axially slidable in said housing and keyed to said cutter support, an axially extending head on said shaft adapted to slide in said slot, said head having a slot in a side face thereof which is inclined to the axis of the shaft, and a cutter mounted on said support for movement toward or away from the axis thereof and having a portion in the slot of said head.

5. An undercutting attachment for a drill press comprising a housing, a cutter support rotatably mounted in the housing and having a central bore provided with a longitudinal radial slot, a cutter mounted for radial movement on said support, a drive shaft axially slidable in said housing and keyed to said cutter support, an axially extending longitudinally tapering head carried by said shaft and adapted to move in said slot and to engage said cutter to move the same radially on said support, and means for limiting the axial movement of said shaft in said housing.

6. An undercutting attachment for a drill press comprising a housing, a cutter support rotatably mounted in the housing and having a central opening provided with a longitudinal radial slot, a cutter mounted for radial movement on said support, a drive shaft axially slidable in said housing, a slidable key connection between said drive shaft and cutter support, an axially extending longitudinally tapering head carried by said shaft and adapted to slide in said slot and to engage said cutter to move the same on said support, means for limiting the axial movement of said shaft in said housing, and means for adjusting said head axially on said shaft to vary the extent of movement of said cutter on its support.

7. An undercutting attachment for a drill press comprising a housing having an axial bore opening to its lower end, a larger bore at its upper end and a shoulder at the lower end of the larger bore, a tubular shaft rotatably mounted in said bore and having an enlarged portion seated on said shoulder, said tubular shaft having an internal longitudinally extending radial slot, a drive shaft mounted for endwise movement in the housing, a slidable key connection between said shaft and the cutter support, a member carried by said shaft and extending into said tubular shaft, a head on said member movable in said slot, and a cutter slidably mounted in said slot and having an inclined portion engaging said head whereby said cutter is moved radially upon an axial movement of said drive shaft.

8. An undercutting attachment for a drill press comprising a housing having an axial bore opening to its lower end, a larger bore at its upper end and a shoulder at the lower end of the larger bore, a tubular shaft rotatably mounted in said bore and having an enlarged portion seated on said shoulder, a drive shaft journaled in the larger bore mounted for endwise movement in the housing and slidably keyed to the enlarged portion of said tubular shaft, cutters mounted for radial movement on said tubular shaft, means operable upon an axial movement of the drive shaft with respect to the tubular shaft for simultaneously imparting radial movements to said cutters, and means for limiting the extent of axial movement of said drive shaft in said housing.

9. An undercutting attachment for a drill press comprising a housing, a cutter support rotatably mounted in the housing with its upper end below the top of the housing and its lower end projecting beneath the housing, means for holding said support against endwise movement in the housing, a cutter mounted for radial movement on said support below the housing, a drive shaft slidable in the top portion of the housing and keyed to the upper end of said support, means connecting said cutter to said drive shaft for outward movement upon downward movement of said shaft and inward movement upon upward movement of the shaft, means for limiting the extent of movement of said shaft in the housing, and a spring support for said shaft for normally holding the shaft in an elevated position and said cutter in retracted position.

10. An undercutting attachment for a drill press comprising a housing having an axial bore opening to its lower end, a larger bore at its upper end and a shoulder at the lower end of the larger bore, a tubular shaft rotatably mounted in said bore and having an enlarged portion seated on said shoulder, said tubular shaft extending below the lower end of the housing, a cutter mounted for radial movement in said tubular shaft below the lower end of said housing, a drive shaft extending axially into said tubular shaft, said drive shaft having an enlarged upper end slidably and rotatably mounted in the larger bore adjacent the upper end of the housing, a slidable key connection between the enlarged portions of said shafts, means connecting said cutter and drive shaft for moving said cutter radially in or out as said drive shaft is moved up or down, and springs interposed between said shafts for normally holding the drive shaft up and said cutter retracted.

11. An undercutting attachment for a drill press comprising a housing having an axial bore opening to its lower end, a larger bore at its upper end and a shoulder at the lower end of the larger bore, a tubular shaft rotatably mounted in said bore and having an enlarged portion seated on said shoulder, said tubular shaft extending below the lower end of the housing, a cutter mounted for radial movement in said tubular shaft below the lower end of said housing, a drive shaft extending axially into said tubular shaft, said drive shaft having an enlarged upper end slidably and rotatably mounted in the larger bore adjacent the upper end of the housing, a slidable key connection between the enlarged portions of said shafts, a member fixed to said drive shaft and slidably keyed to said cutter to move the cutter in and out as the drive shaft is moved up and down, and springs interposed between said shafts for normally holding said shaft up and said cutter retracted.

12. An undercutting attachment for a drill press comprising a housing having an axial bore opening to its lower end, a larger bore at its upper end and a shoulder at the lower end of the larger bore, a tubular shaft rotatably mounted in said bore and having an enlarged portion seated on said shoulder, said tubular shaft extending below the lower end of the housing, a cutter mounted for radial movement in said tubular shaft below the lower end of said housing, a drive shaft extending axially into said tubular shaft, said drive shaft having an enlarged upper end slidably and rotatably mounted in the larger bore adjacent the upper end of the housing, a slidable key connection between the enlarged portions of said shafts, a member fixed to said drive shaft and slidably keyed to said cutter to move the cutter in and out as the drive shaft is moved up and down, and means for adjusting said member axially of the drive shaft to vary the extent of radial movement of said cutter.

13. An undercutting attachment for a drill press comprising a housing having an axial projection at its lower end adapted to enter a bore in a workpiece, an axial bore extending through said projection, a larger bore in its upper portion and a shoulder at the lower end of said larger bore, a tubular shaft rotatably mounted in said bore and having a pilot portion beneath the housing projection, said shaft having an enlarged portion seated on said shoulder, a cutter beneath the lower end of said projection mounted for radial movement in said tubular shaft, a drive shaft having an upper end portion slidably and rotatably mounted in said larger bore, a sliding key connection between the enlarged ends of said shafts, and a member attached to said drive shaft and slidably keyed to said cutter for moving the cutter in or out as the drive shaft is moved up or down.

14. An undercutting attachment for a drill press comprising a housing having an axial projection at its lower end adapted to enter a bore in a workpiece, an axial bore extending through said projection, a larger bore in its upper portion and a shoulder at the lower end of said larger bore, a tubular shaft rotatably mounted in said bore and having a pilot portion beneath the housing projection, said shaft having an enlarged portion seated on said shoulder, a cutter beneath the lower end of said projection mounted for radial movement in said tubular shaft, a drive shaft having an upper end portion slidably and rotatably mounted in said larger bore, a sliding key connection between the enlarged ends of said shafts, a member attached to said drive shaft and slidably keyed to said cutter for moving the cutter in or out as the drive shaft is moved up or down, and springs interposed between the enlarged portions of said shafts for normally holding the drive shaft up and the cutter in retracted position.

15. An undercutting attachment for a drill press comprising a housing having an axial projection at its lower end adapted to enter a bore in a workpiece, an axial bore extending through said projection, a larger bore in its upper portion and a shoulder at the lower end of said larger bore, a tubular shaft rotatably mounted in said bore and having a pilot portion beneath the housing projection, said shaft having an enlarged portion seated on said shoulder, a cutter beneath the lower end of said projection mounted for radial movement in said tubular shaft, a drive shaft having an upper end portion slidably and rotatably mounted in said larger bore, a sliding key connection between the enlarged ends of said shafts, a member attached to said drive shaft and slidably keyed to said cutter for moving the cutter in or out as the drive shaft is moved up or down, and means for adjusting said member axially of said drive shaft to vary the extent of radial movement of said cutter.

16. An undercutting attachment for a drill press comprising a housing having an axial projection at its lower end adapted to enter a bore in a workpiece, an axial bore extending through said projection, a larger bore in its upper portion and a shoulder at the lower end of said larger bore, a tubular shaft rotatably mounted in said bore and having a pilot portion beneath the housing projection, said shaft having an enlarged portion seated on said shoulder, a cutter beneath the lower end of said projection mounted for radial movement in said tubular shaft, a drive shaft having an upper end portion slidably and rotatably mounted in said larger bore, a sliding key connection between the enlarged ends of said shafts, a member attached to said drive shaft and slidably keyed to said cutter for moving the cutter in or out as the drive shaft is moved up or down, means for adjusting said member axially of said drive shaft to vary the extent of radial movement of said cutter, means for limiting the upward movement of said drive shaft, and springs interposed between the enlarged portions of said shafts for normally holding the drive shaft up and the cutter in retracted position.

WILLIAM C. KNAPP.